US006746654B2

(12) United States Patent
Mehta et al.

(10) Patent No.: US 6,746,654 B2
(45) Date of Patent: Jun. 8, 2004

(54) DRY AND SEMI-DRY METHODS FOR REMOVAL OF AMMONIA FROM FLY ASH

(75) Inventors: Arun K. Mehta, Los Altos, CA (US); Robert H. Hurt, Barrington, RI (US); Yuming Gao, Providence, RI (US); Xu Chen, Providence, RI (US); Eric M. Suuberg, Barrington, RI (US)

(73) Assignee: Brown University Research Foundation, Providence, RI (US)

( * ) Notice: Subject to any disclaimer, the term of this patent is extended or adjusted under 35 U.S.C. 154(b) by 0 days.

(21) Appl. No.: 10/309,672

(22) Filed: Dec. 4, 2002

(65) Prior Publication Data

US 2003/0110985 A1 Jun. 19, 2003

Related U.S. Application Data

(60) Provisional application No. 60/338,151, filed on Dec. 6, 2001.

(51) Int. Cl.[7] .............................. C01C 1/02; C04B 18/06
(52) U.S. Cl. ................. 423/237; 106/705; 106/DIG. 1; 209/11; 423/238; 423/352; 423/356
(58) Field of Search .......................... 106/705, DIG. 1; 209/11; 423/237, 238, 352, 356

(56) References Cited

U.S. PATENT DOCUMENTS

| 5,069,720 | A | | 12/1991 | Epperly et al. | 106/287.35 |
|---|---|---|---|---|---|
| 5,211,926 | A | | 5/1993 | Martin et al. | 423/237 |
| 6,033,637 | A | * | 3/2000 | Akahoshi et al. | 423/155 |
| 6,077,494 | A | | 6/2000 | Gasiorowski et al. | 423/357 |
| 6,136,089 | A | | 10/2000 | Hurt et al. | 106/705 |
| 6,290,066 | B1 | * | 9/2001 | Hwang | 209/164 |
| 6,395,145 | B1 | * | 5/2002 | Altman | 204/164 |
| 6,422,392 | B1 | * | 7/2002 | Levy | 209/11 |
| 6,521,037 | B1 | * | 2/2003 | Hurt et al. | 106/405 |
| 2003/0147795 | A1 | * | 8/2003 | Mehta et al. | 423/237 |
| 2003/0202927 | A1 | * | 10/2003 | Minkara et al. | 423/237 |
| 2003/0205173 | A1 | * | 11/2003 | Minkara | 106/705 |
| 2003/0205184 | A1 | * | 11/2003 | Ramme et al. | 110/345 |
| 2003/0211024 | A1 | * | 11/2003 | Wojichowski | 423/235 |

FOREIGN PATENT DOCUMENTS

| JP | 56-166978 A | * | 12/1981 |
| JP | 58-58182 A | * | 4/1983 |
| JP | 59-59237 | * | 4/1984 |
| JP | 2002-166266 A | * | 6/2002 |

OTHER PUBLICATIONS

Derwent Abstract No. 1988–293989, abstract of German Patent Specification No. 3711503 A (Oct. 1988).*
Derwent Abstract No. 1989348962, abstract of German Patent Specification No. 3815963 A (Nov. 1989).*
Abstract of Japanese patent JP8187484A issued Jul. 23, 1996.

* cited by examiner

Primary Examiner—Anthony J. Green
(74) Attorney, Agent, or Firm—Armstrong, Kratz, Quintos, Hanson & Brooks, LLP

(57) ABSTRACT

A method for removing ammonia from fly ash employs water mist (a water fog) or a flowing warm humid air stream to rid the fly ash of ammonia. Ozone alone or with other co-oxidants such as hydrogen peroxide are also used to rid fly ash of ammonia.

24 Claims, 12 Drawing Sheets

DRY AND SEMI-DRY METHODS FOR REMOVAL OF AMMONIA FROM FLY ASH

RELATED APPLICATION

Figure 1:
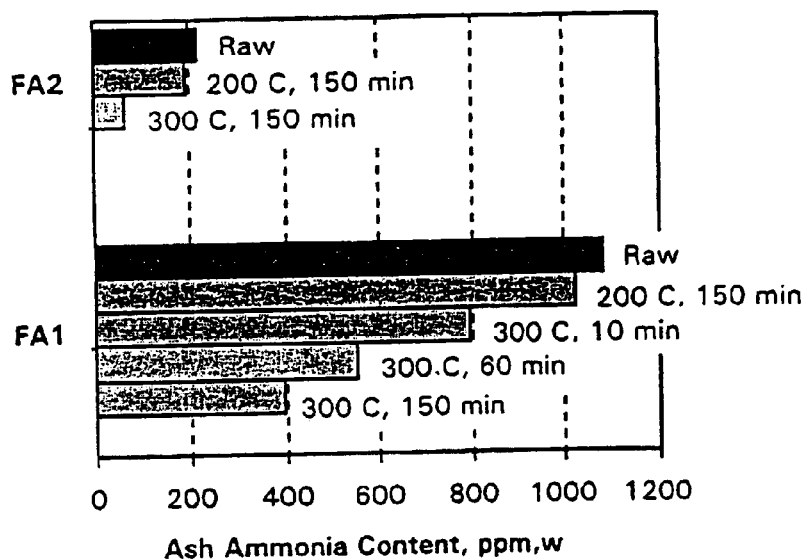

This application is related to provisional patent application Serial No. 60/338,151 filed Dec. 6, 2001.

FIELD OF THE INVENTION

The herein disclosed invention finds applicability in the field of coal combustion flue gas purification and more particularly in the field of fly ash purification.

BACKGROUND OF THE INVENTION

Ammonia vapor comes into contact with fly ash in connection with several processes for NOx reduction or particulate capture in pulverized coal combustion, including selective catalytic reduction (SCR), selective non-catalytic reduction (SNCR), and electrostatic precipitator conditioning [Castle, 1980, Golden, 2001]. Typically some portion of the vapor phase ammonia adsorbs or deposits on fly ash with the potential to cause problems in ash utilization, handling, and disposal [Larrimore, 2000]. Of particular concern for disposal is the possibility for high ammonia contents in surface and groundwater near ash ponds [Golden, 2001] and at landfill sites in runoff, leachate and surrounding atmosphere [Lowe et al., 1989; Golden, D., 2001]. Problems in utilization arise not from degradation of concrete properties [Novak and Rych, 1989; Golden, 2001] but rather from worker exposure to odor, especially during enclosed concrete pours. Ammonia odors are perceived as a sufficiently serious nuisance that levels of 300 ppm or more by weight in ash (not uncommon in untreated fly ash streams from units with SCR systems), can effectively destroy the ash utilization market. Acceptable ammonia levels to avoid problems in utilization and disposal have been cited by different sources as less than 50, 60, or 100 ppm [Novak and Rych, 1989; Necker, 1989].

There are few publications in the archival scientific literature on ash/ammonia interactions, exceptions being the work of Janssen et al. [1986] which focused on catalysis of the $NO/NH_3$ reaction and most notably the work of Turner et al. [1994], which focused on the mechanism of adsorption and its potential impact on the operation of flue gas treatment technologies. Recently, however, there has been a flurry of applied studies reported in the conference literature, patent literature, and in industry reports, motivated by current projections of widespread SCR unit installation in the U.S. in the coming years [Muzio et al., 1995; Hinton, 1999; Larrimore, 2000; Golden, 2001; Brendel et al., 2001; Levy et al., 201; Rubel et al., 2001; Ramme and Fischer, 2001; Bittner et al., 2001]. These sources discuss many aspects of the ammonia/ash problem and present a number of new ideas for remediation processes. The factors governing the extent of ammonia contamination are not fully understood, but are believed to depend on the concentration of unreacted ammonia leaving the SCR unit (the "ammonia slip"), duct temperatures/time history, ash composition [Muzio et al., 1995], and $SO_3$ concentration in the flue gas [Larrimore, 2000, Turner et al., 1994, Muzio et al., 1995]. Ammonia associated with fly ash can be in the form of ammonium sulfate or more commonly bisulfate particles [Golden, 2001; Rubel et al., 2001], or ammonia species adsorbed on carbon sites [Rubel, 2001], likely on carbon surface oxides, or mineral surfaces [Turner, et al. 1994]. Ammonia is well known to chemisorb on acidic surface sites [Sahu, et al., 1998], and indeed is extensively used as a titrant to characterize surface acidity [Gedeon et al., 2001].

Relevant Patents

1. U.S. Pat. No. 6,136,089, "Apparatus and Method for Deactivating Carbon in Fly Ash". This patent describes the use of ozone to improve the air entrainment behavior of fly ash by modifying the surface chemistry of unburned carbon, e.g., carbon passivation vs. ammonia reduction.
2. U.S. Pat. No. 6,077,494, "Method for Removing Ammonia from Ammonia Contaminated Fly Ash". This recent patent covers the use of very small amounts of water (<5%), in the so-called semi-dry state. The patent makes no mention of method of water addition, requires intense mechanical agitation of the ash, and does not mention humid air, or ozone.
3. Japanese patent JP8187484A describes a process for removing ammonia that involves a humidifier. The process involves intense mechanical agitation and there is no mention of using warm humid air, which holds sufficient moisture that upon cooling in contact with co-flowing ash will deliver a uniform and controlled moisture level.
4. U.S. Pat. No. 5,069,720, U.S. Pat. No. 5,211,926, International patent 99/48563 describe the use of water to remove ammonia, but in large amounts that classify these as truly "wet" techniques.

Experimental Background

There is almost no information in the archival scientific literature on methods of ammonia removal from fly ash, despite great commercial interest in a variety of competing techniques [Larrimore, 2000, Golden, 2001], including thermal methods [Levy et al., 2001], combustion-based methods [Giampa, 2001], and water-based methods [Gasiorowski and Hrach, 2000; Katsuya et al., 1996; Hwang, 1999]. An objective of the present invention is to investigate the chemistry of room temperature methods for ammonia removal from fly ash using moisture and oxidizing agents, alone or in combination. In a study, special emphasis was placed on controlled addition of small amounts of moisture to avoid wet ash handling, so-called "semi-dry processing", which is the basis for several industrial patents [Gasiorowski and Hrach, 2000; Katsuya et al., 1996], and on the use of ozone, which has recently been found to passivate unburned carbon surfaces in fly ash and thus improve air entrainment properties of problem ash streams [Gao et al., 2001].

Objects of the Invention

A main object of this invention is to remove ammonia from fly ash employing a minimum amount of water.

An important object of this invention is to remove ammonia from fly ash without sensibly wetting the fly ash with water.

A further object of the invention is to effectively use ozone for ammonia removal from fly ash, alone or in combination with moisture.

A still further object of this invention is to carry out the process of ammonia removal at temperatures under 150° C.

These and other objects of the present invention will become apparent from a reading of the following specification taken in conjunction with the enclosed drawings.

BRIEF SUMMARY OF THE INVENTION

The herein disclosed invention involves a process for ridding fly ash of ammonia that avoids the use of sensible moisture; but instead uses a water fog (water mist) or warm humid air.

The terms water fog and water mist are used interchangeably in this disclosure.

Also, disclosed by the invention is the use of ozone to rid the fly ash of ammonia.

A method of this invention for removing ammonia from fly ash comprises subjecting ammonia containing fly ash to a water mist wherein the water mist contacts the ammonia containing fly-ash and removes the ammonia from the fly ash. The water mist can be applied to the fly ash in a warm air environment or the mist can be applied in humid air. In a specific method of the invention, the fly ash is a basic fly ash and/or the water mist has a high pH. In another specific method for removing ammonia from fly ash, a water mist is applied to a co-flowing fly ash stream in controlled amounts to produce fly ash with uniform 1–5 wt-% moisture with water droplets being fine enough to remain suspended as an aerosol for uniform wetting of the dispersed ash after mist/ash mixing and afterwards the co-flowing suspension is subjected to gas/particle separation to yield a reduced-ammonia ash suitable for disposal/utilization and an ammonia-laden waste gas stream.

Another method for removing ammonia from fly ash comprises subjecting ammonia containing fly ash to a water fog (water mist) wherein the water fog or mist contacts the ammonia containing fly ash and removes the ammonia from the fly ash. The water fog can be applied in a warm environment. As a further embodiment, the fog is produced with an ultrasonic nebulizer in a flowing humid air stream flowing through an agitated fly ash bed. In the water fog process, the treated ash can be a basic ash or when the ash is an acid ash, it should be treated to make it basic. The fly ash can be mixed with additives, such as, $Ca(OH)_2$ to make it basic. As an added feature of the water fog method, ozone, ozone-containing air or ozone-containing oxygen is used as the fog carrier gas, or is used as an additional step to further reduce the ammonia level in ash as well as to rid the fly ash of residual evolved ammonia and residual moisture. In a specific embodiment, a co-oxidant, such as, $H_2O_2$ solution is used as the liquid feed for fog generation.

A still further method for removing ammonia from fly ash comprises subjecting ammonia containing fly ash to warm humid air wherein the warm humid air contacts the ammonia containing fly-ash and dissolves and removes the ammonia from the fly ash. The method can be carried out by passing a stream of humidified air through a fixed bed of fly ash in up-flow configuration. The method for removing ammonia from fly ash can be based on the addition of warm humid air to a co-flowing fly ash stream of lower temperature. The temperature and flow rate of the humid air are controlled so that when the suspension is mixed and cooled to ambient temperature, water vapor condenses in an amount that constitutes 1–5 wt-% moisture in the solid ash for optimal semi-dry ammonia removal. After mixing of the fly ash and warm humid air, the co-flowing suspension is subjected to gas/particle separation to yield a reduced-ammonia ash suitable for disposal or utilization and, also, an ammonia-laden waste gas stream.

An additional important method of this invention is for reducing ammonia in fly ash comprising applying effective amounts ozone to the fly ash to reduce ammonia therein. In the ozone treating process, the fly ash can be in the dry or semi-dry state. The ozone application can be done in a co-flowing suspension, fluidized bed, or a mechanically agitated bed. As specific examples of the method, the ozone is applied at a concentration of about 2 Vol % and at a temperature of about 150° C. in an amount of from 0–500 gm ozone/per Kg ash.

An important process of this invention for removing ammonia from fly ash comprises treating the fly ash with both low moisture and ozone treatment to accomplish dry or semi-dry (<5 wt-% moisture) ammonia reduction at temperatures below 150° C. A further method for ridding fly ash of ammonia comprises applying a mixture of effective amounts of hydrogen peroxide ($H_2O_2$) and ozone as co-oxidizing agents in a flowing fog Materials and Experimental Procedures Samples with reference to Tables 1–3 below Four commercial ash samples were selected for this study from among the 80 ash samples in the Brown University ash sample bank [Kulaots, 2001]. Properties of the selected samples are shown in Tables 1 and 2. FA1 and FA2 are ammoniated ash samples, one with high and one with low pH, from two power stations in the New England region operating SNCR units and burning bituminous coals. FA3 and FA4 are typical non-ammoniated ashes from eastern and western U.S. coals respectively, and are used in experiments in which ammonia is loaded on the ash under a variety of laboratory conditions. Note that both the carbon content and the ammonia content of FA1 is unusually high. At 1060 ppm this ash has more than ten times the amount of ammonia that is commonly cited as the desired amount to avoid ash utilization problems [Larrimore, 2000]. The basic nature of FA1 is unusual for a class F ash whose alkaline and alkaline earth components sum to only 6.2 wt-% on a carbon-free basis (see Table 2). It can be shown by simple equilibrium calculations for the reaction $NH_3+H_2O \rightarrow NH_4^+ +OH^-$ that this basicity is in part due to its very high ammonia content. Consider 1 gm of ash in 30 ml of water, as used in our pH measurement procedure. If the 1060 ppm of ammonia is completely desorbed from the surfaces into solution in the aqueous phase, a pH of 10.3 would be observed before significant volatilization occurred if the remainder of the ash constituents (mineral phases and carbon surfaces) were neutral. Thus part of the basicity of the ash can be attributed to the ammonia itself.

Experimental Procedures

Fly Ash Characterization

The ammonia content of a test fly ash sample was determined by mixing two grams of ash with 3 ml of 2 v/v-% $H_2SO_4$ and 37 ml distilled water. The suspension was dispersed in an ultrasonic bath for 5 minutes, and the solid ash was separated from the solution by a 10-minute centrifugation. The supernatant solution was then filtered and 30 ml used to measure ammonium ion concentration by specific ammonium ion electrode and Corning pH/ion analyzer model 455. Potassium ion is known to interfere with the accurate measurement of ammonia, but the potassium levels in the samples tested were too low for the interference to be significant (Table 2).

The acid/base character of test fly ash samples were measured by mixing 1 gm of ash with 30 ml distilled water and dispersing the particles in an ultrasonic bath for 5 minutes. After centrifugation and filtration as above, the pH of the solution was measured by a Corning pH/ion analyzer 455. The thermal desorption results were obtained with an Autosorb vapor adsorption apparatus used in out gassing mode to desorb $NH_3$ from 3–5 gm ash samples as a function of temperature and time under vacuum.

Experiments in Static Humid Air

Ash samples were enclosed in a laboratory desiccator adjacent to calibrated aqueous solutions designed to provide gas environments of known $H_2O$ and/or ammonia partial pressure. In the first type of experiment, 5 gms of an ammonia-containing fly ash was placed in a 50×9 mm dish and loaded into a 150 mm desiccator. A separate 90×50 mm dish was prepared with 40 ml of standard salt solutions designed to provide fixed relative humidity according to the procedure of Wexler et al. [1991]. Using 20 gm salt in 40 ml of water at 25 C. the relative humidity (RH) values are 75% (NaCl), 84% (KCl), 92% (KNO$_3$). Both the ammonia content and the moisture content of the ash samples were measured before and after exposure.

The second type of experiment is identical to the first, except that calibrated solutions of ammonium salts were used instead of KCl, NaCl, or KNO$_3$. Dilute ammonium hydroxide solutions were prepared at various concentrations and the ammonia vapor concentration measured in the desiccator for calibration [Fujisaki, 2000]. These experiments create vapor environments with both H$_2$O and NH$_3$ and, although designed to load NH$_3$ onto ash, in fact are capable of producing a net adsorption or net desorption of ammonia on/from ash, depending on ash type and conditions.

Experiments in Flowing Humid Air

A fixed/fluidized bed reactor was used to contact ash with a continuous stream of air at a fixed relative humidity. Ten grams of ash were placed in a 25 mm diameter glass tube fitted with a porous glass distributor disc at the bottom with 0.15–0.18 mm pores and subjected to continuous mechanical vibration. The air flow to the reactor bottom was set at either 0.3 lit/min or 0.8 lit/min and was pre-humidified in a series of two water-filled tubes, while the humidity was measured at the reactor inlet using a digital hygrometer with an accuracy of ±2% RH. Ash moisture and ammonia contents were measured before and after treatment by ion electrodes as described above.

Experiments with Flowing Fog

These experiments were similar to those in humid air, but an ultrasonic nebulizer was used to introduce ultrafine water droplets to the humidified air upstream of the contact vessel, and some mechanical stirring was carried out manually or with a magnetic stir bar. Here 10 gm of ash was placed in a 40 mm diameter reactor fitted with the same porous distributor (0.15–0.18 mm pore size) and exposed to a fog-containing upward airflow of 0.7 lit/min. After water addition the sample was removed and the ammonia content measured. Half of the sample (5 gm) was returned to the glass reactor and dried in flowing air without water mist at a flow rate of 0.3 lit/min. The time between the end of the fog treatment and the beginning of the drying stage was always 1 minute. All experiments were at ambient temperature.

Additional experiments were conducted for acidic ashes in which basic additives, NaOH or Ca(OH)$_2$, were introduced into the liquid feed for fog generation. As an alternative, the basic additives can also be added as a dry powder to the ash prior to treatment. In another variant on the basic experiment, ozone-containing air or oxygen was used in place of pure air as the dry-off gas or fog carrier gas. In yet another variant of the basic experiment 30 wt-% H$_2$O$_2$ solution was employed as the liquid feed for fog generation in place of water. Joint treatment with ozone and H$_2$O$_2$ is the "peroxone" route to aqueous ammonia oxidation [Kuo et al., 1991]. Experiments were also carried out in which dry ozone-containing air or oxygen were passed through the fixed bed of ash without moisture addition.

Results and Discussion

FIGS. 1–4, 6–11 and Table 3 summarize the experimental results. FIG. 1 describes vacuum thermal desorption behavior of two ammonia containing ash samples from the field. FIG. 1 shows that 200° C. is insufficient to remove significant ammonia, but that a majority of the ammonia in these ash samples can be removed by thermal treatment alone at 300° C. FIG. 1 also shows that the required desorption times are long at 300° C., either due to desorption/decomposition kinetics or to slow diffusion through the deep sample beds. This simple thermal desorption experiment does not provide sufficient information to positively identify the ammonia form or forms, but significant evolution does occur at temperatures characteristic of ammonium bisulfate compositions (decomposition onset 214° C. in inert [Rubel et al., 2001]).

Figure 2:
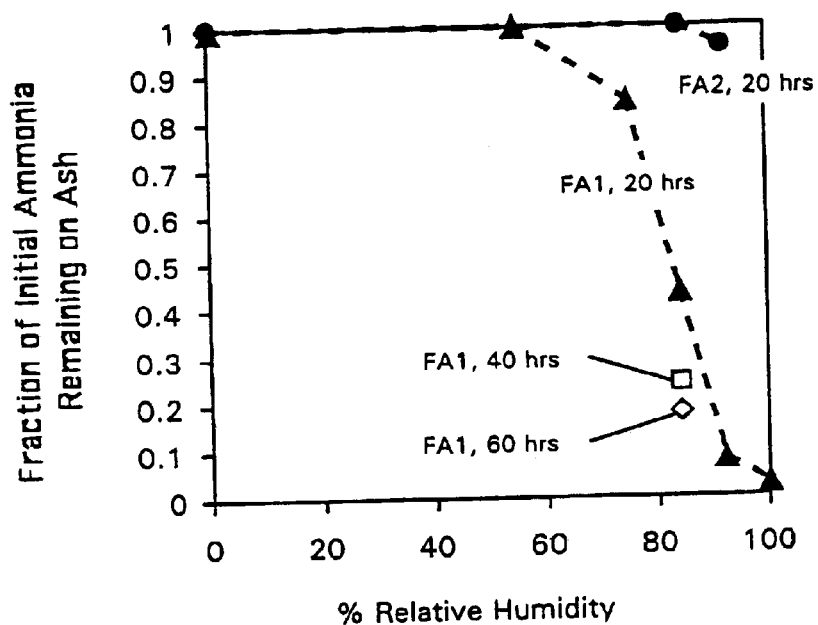

FIGS. 2–8, 10, 11 and Table 3 summarize a large set of ammonia-removal experiments using controlled amounts of moisture at ambient temperature. FIG. 2 presents results from the earliest set of experiments, those using static humid air in closed desiccators. The plot shows that ammonia can be completely removed from the high-pH ash, FA1, simply by placing it near a dish with an aqueous salt solution to create an atmosphere of controlled humidity, i.e., under conditions where no liquid water is added directly to the ash sample.

Exposure to static humid air is observed to increase ash moisture content from about 0.8% initially to values ranging form 1.3–1.9%. It is believed that slight condensation in and around the individual ash/carbon particles causes the ammonia species to desorb, enter solution, and be converted to the highly volatile NH$_3$ form according to:

$$NH_3(aq) + H_2O\ (liq) \leftrightarrows NH_4^+(aq) + OH^-(aq) \quad (1a)$$

$$NH_3(aq) \leftrightarrows NH_3(vap) \quad (1b)$$

NH$_3$ is highly volatile so equilibrium 1b favors partitioning to the vapor phase, while equilibrium 1a is highly dependent on solution pH. The combined reaction system (1a and 1b) leads to NH$_3$ as the predominant species and thus, leads to extensive ammonia volatilization whenever pH values are greater than about 10 in the condensed film. Water vapor is always below saturation in the FIG. 2 experiments, so partial condensation occurs by adsorption on surfaces and capillary condensation in pores and fine intraparticle spaces. It is notable that ammonia removal can occur with the addition of so little liquid water (1.3–1.9 wt-%) that ash handling characteristics are not greatly affected.

FIG. 2 describes results of experiments on ammonia removal in static humid air. Initial ash moisture contents were 0.82 wt-% for FA1, and 0.80 wt-% for FA2. Moisture contents of selected treated ash samples shown on this figure were as follows: 1.3% for FA2 at RH84 (20 hrs); 1.6% for FA2 at RH94 (20 hrs); 1.6% for FA1 at RH84 (20–60 hrs); and 1.9% for FA1 at RH92 (20 hrs). FIG. 2 also shows that the process is not effective for the low-pH ash, FA2. The critical role of solution pH is further illustrated in FIG. 3, which presents results for two acidic and two basic ashes placed in proximity to aqueous ammonia solutions. The standard solutions were designed to create vapor environments with known partial pressures of ammonia. Although the original goal of these experiments was to load ammonia onto ash, it was found that this exposure can either increase or decrease ash ammonia content depending on ash type. Both acidic ashes (FA2,3) adsorbed ammonia from the solutions, as expected (see FIG. 3). but the basic ash, FA1, experienced a large ammonia loss. Further, adding a basic additive to the acidic ash, FA3, eliminated the uptake completely. Additional experiments on other ash samples show the same trends with pH [Fujisaki, 2001]. We conclude that in the presence of near-saturated humid air, we can remove but not add ammonia to basic ashes, and conversely we can add but not remove ammonia from acidic ashes.

Figure 3:
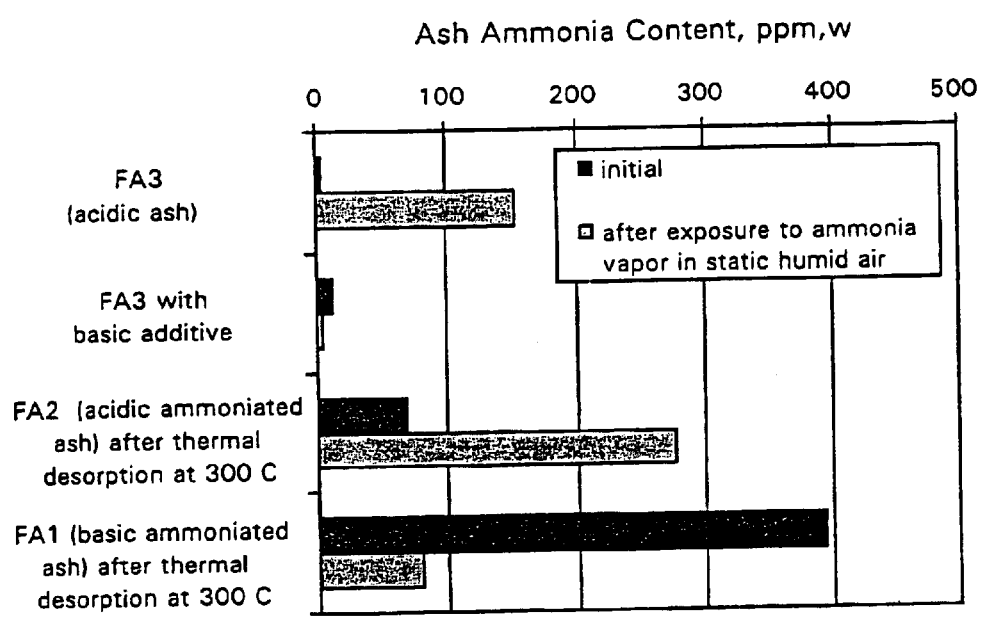

FIG. 3 illustrates effect of pH on the removal or addition of ammonia in static mixtures of humid air and ammonia vapor (700 ppm) established with a calibrated ammonium hydroxide solution. The basic additive was CaO as a dry powder added to the ash. Similar results were obtained when CaO was added in solution, or using $Ca(OH)_2$ either as a dry powder or in solution. These results combinedly show that the ammonia release is governed by solution chemistry as embodied by Eq. 1, despite the very low moisture levels. It appears that above 1–2% moisture, a water film forms in and around individual particles and is sufficiently continuous to dissolve the adsorbed or deposited ammonia and to mediate its release in a way that is at least qualitatively similar to bulk solution behavior. This is not an obvious result considering the dry physical appearance of the ash and the lack of macroscopic evidence of a continuous water phase. The effectiveness of small amounts of water is claimed in several process patents [Gasiorowski and Hrach, 2000; Katsuya et al., 1996] where the authors quote the advantages of rapid ammonia release and quasi-dry ash handling. We demonstrate here that even exposure to static humid air can bring about these effects.

Figure 4:
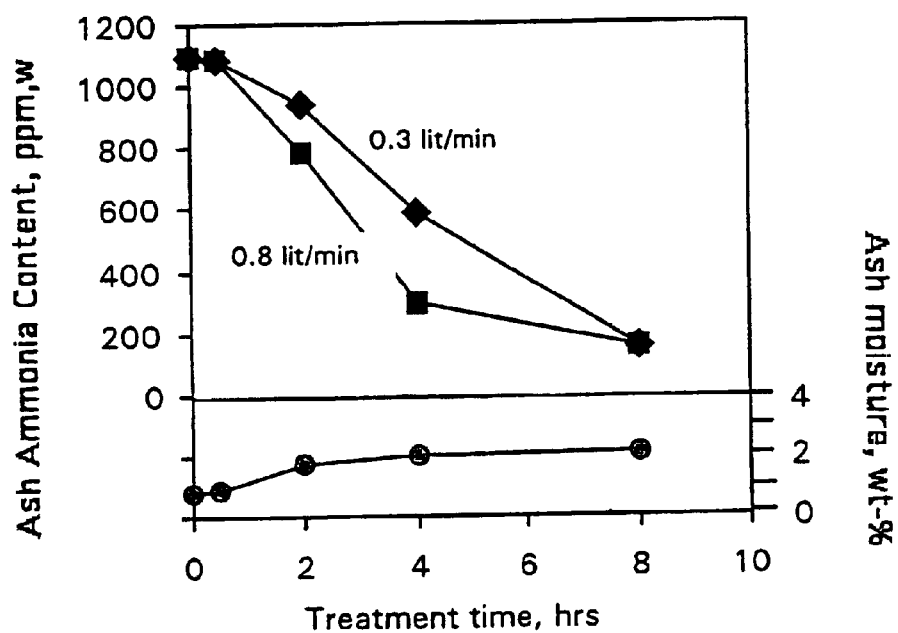

A more effective contacting scheme employs a continuous stream of humidified air passed through a fixed bed of ash in upflow configuration. FIG. 4 shows the results of ammonia removal experiments in flowing humid air (RH 93%) passed upward through 10 gm fixed beds of ash at one of two different flowrates. Sample: basic fly ash, FA1. FIG. 4 also illustrates that this contacting method is effective at removing ammonia from the basic ash at moisture levels of less than 3 wt-%. The rate of removal increases with increasing moisture content, but the total contact times are still long. The long times are believed to be the result of (1) the slow rate of water addition due to the limited carrying capacity for water vapor in room temperature air (0.023 mole fraction), (2) the low driving force for water addition to the solid phase, which at these subsaturated conditions is driven by adsorption and capillary condensation, and (3) slow diffusion of dissolved species within the microscopic water film.

Figure 5:
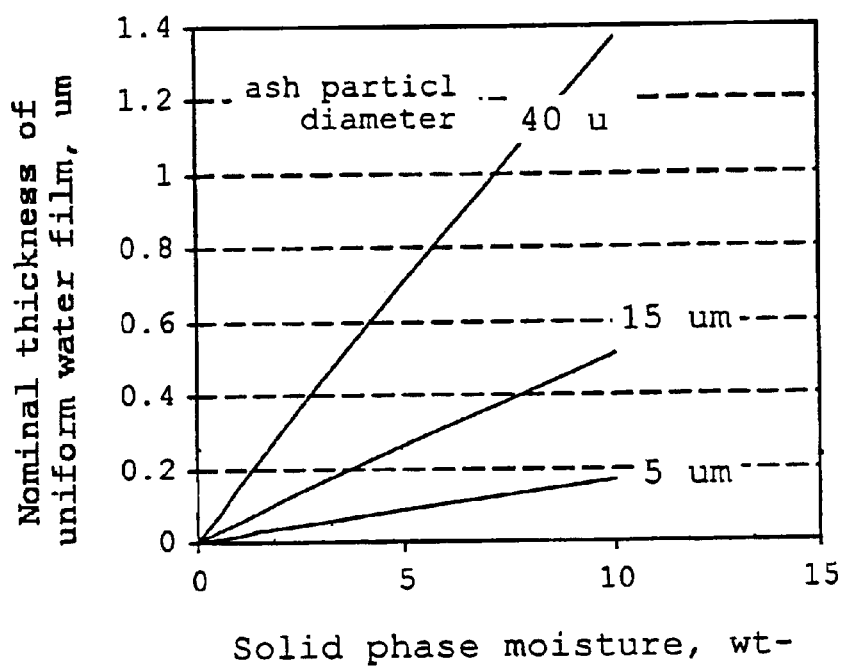

The structure and properties of the water film can be appreciated by several simple calculations. For example, FIG. 5 describes the thickness of uniform water film on collection of ideal, nonporous, monodisperse spherical particles of typical mineral density, 2.2 $g/cm^{-3}$. This calculation demonstrates that the water film produced by most humid air and flowing fog experiments (moisture contents 1–5%) have sub-micron mean dimensions. FIG. 5 further shows the geometric relationship between moisture content and water film thickness for an ideal ensemble of monodisperse, non-contacting spheres of density 2.2 $gm/cm^3$, similar to the density of mineral phases in fly ash. The small amounts of water employed here give rise to a nominal film thickness well below 1 mm. For the humid air experiments, we further expect the water film to be highly non-uniform, consisting of very thin mono- or multi-layer adsorbed films on external particle surfaces or large pore surfaces in carbon, coexisting with bulk moisture in fine pores and fine neck regions lying at points of particle contact. The Kelvin equation describes this sub-saturation condensation, and for the simple case of spherical geometry yields a maximum size of filled pores (or filled particle interstitial regions) of 1.5 nm at 50% RH, 5 nm at 80% RH, and 21 nm at 95% RH under these conditions. We therefore expect bulk water only in nanometric (meso) pores and nanometric interstitial regions. We expect much of the ash surface to be covered only by a multi-layer adsorbed film, making the water phase only semi-continuous and leading to slow diffusion of dissolved species. On the other hand, desorption may be aided by the fact that ammonium salts and adsorbed ammonia species may serve as attractive sites for preferential water adsorption or condensation.

Flowing Fog.

Figure 6:
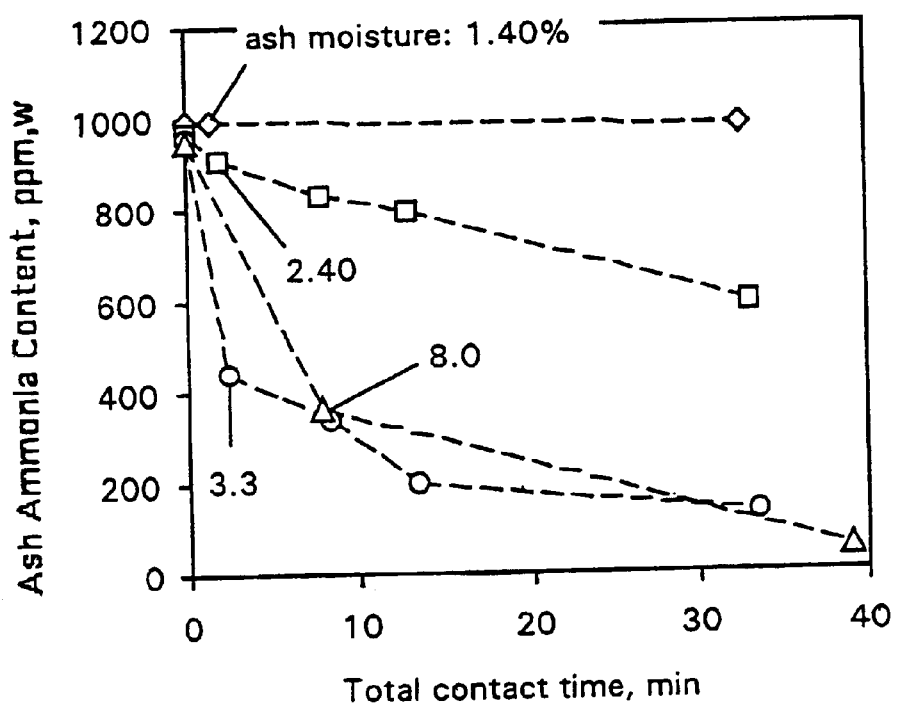
Figure 7:
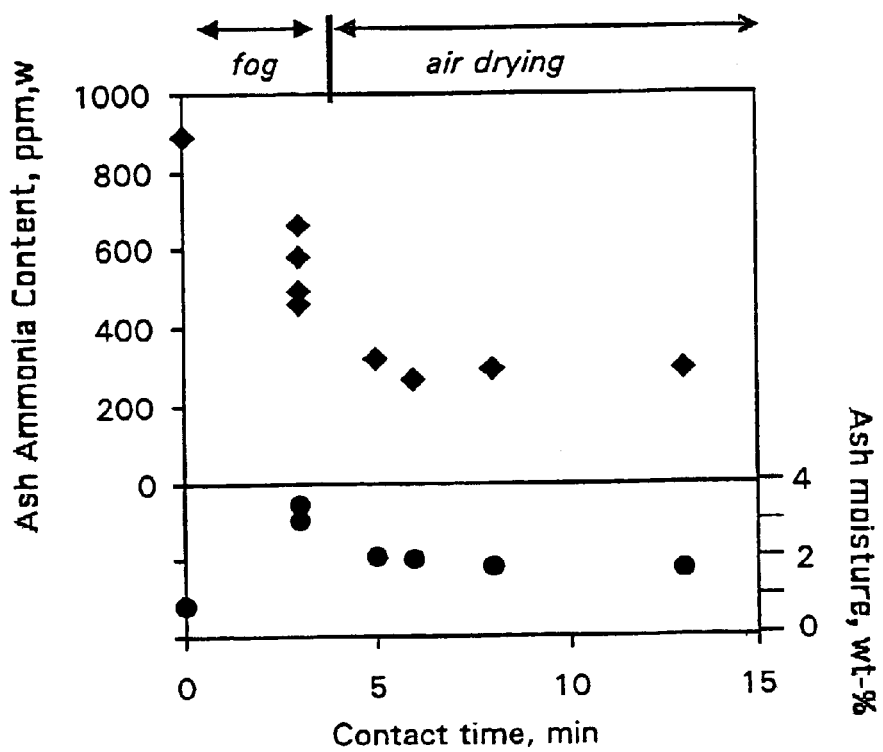

In an attempt to reduce required contact times, experiments were performed in which 2–3 wt-% water is introduced quickly to the ash using an ultrasonic nebulizer to create a fine fog in the flowing humid air stream. The ultrafine water droplets remain in a quasi-stable aerosol as they pass through the porous distributor disk and enter the agitated ash bed. FIG. 6 shows the effect of the fog on ammonia removal under a variety of conditions and further describes results of ammonia removal with flowing fog followed by air drying to remove untreated mist or fog from the ash (sample: basic ash, FA1). The extent of moisture addition is varied by varying the total fog generation time from 2–8 minutes. Moisture-in-ash measurements are shown on graph at the end of the fog addition prior to the start of air drying. FIG. 7 describes ammonia removal by flowing fog. Plot shows time resolved values of both ash moisture and ammonia content during fog addition and air drying. Multiple points at 3 minutes represent duplicate experiments. These experiments take place in two parts: a fog addition stage lasting 2–8 minutes followed by a drying stage in air lasting 4–30 minutes. The labeled data points give the ash moisture content at the end of the fog stage and prior to the onset of drying. As moisture levels rise above 2 wt-%, ammonia liberation becomes very rapid.

Adding 3.3 wt-% water in 2 minutes drives off over half of the adsorbed ammonia with no drying time. FIG. 7 shows the time resolved measurements of both ammonia and ash moisture in another flowing fog experiment. At moisture levels above 3 wt-% ammonia removal is rapid, but the rate falls off quickly when moisture levels drop to about 2% during the subsequent drying stage. These combined results show promise for practical processes involving rapid uniform addition of small amounts of moisture followed by limited air drying to achieve high levels of ammonia removal.

Figure 8:
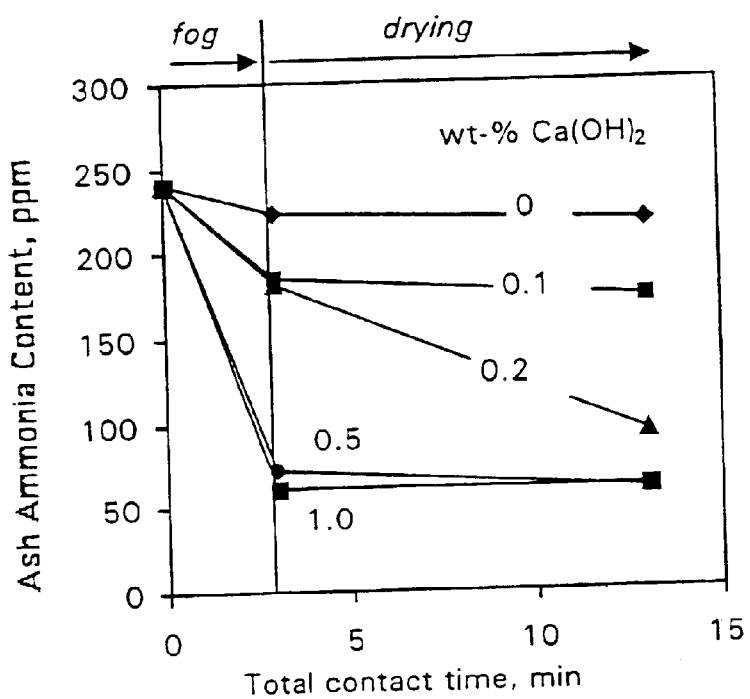

Flowing fog treatment produces rapid ammonia release, but was observed in separate experiments to be ineffective for acidic ashes which represent a technologically important fly ash class. Several industrial patents [Gasiorowski and Hrach, 2000; Katsuya et al., 1996] and the results of FIG. 2 in static humid air suggest that acidic ashes can be successfully treated after introduction of inexpensive basic additives. FIG. 8 and Table 3 confirm this behavior for the flowing fog treatment using NaOH solutions for fog generation (Table 3) or $Ca(OH)_2$ added as a dry powder to the ash.

FIG. 8 describes the effect of dry $Ca(OH)_2$ as basic additive on ammonia removal from acidic ash (FA2) with flowing fog. Moisture levels in the ash were similar in the 5 experiments, ranging from 3.3% to 3.9% directly after fog addition, and ranging from 2.1% to 2.7% after drying.

Experiments with Ozone.

Figure 9:
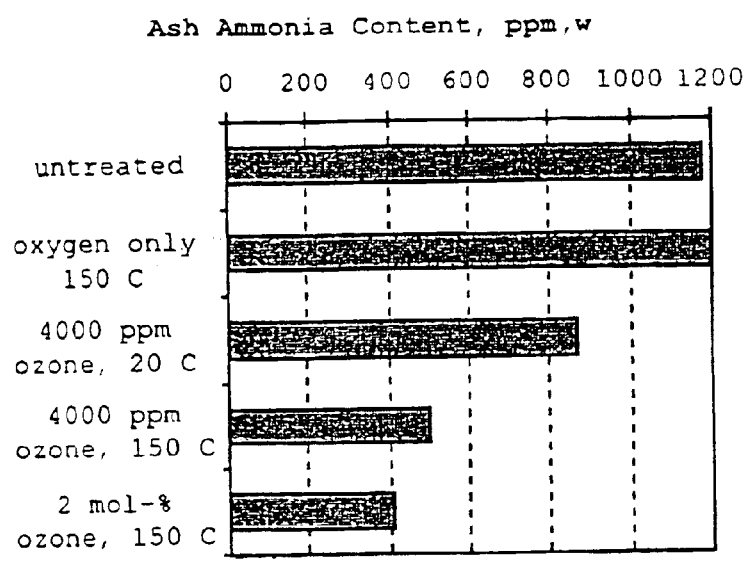

FIG. 9 describes reduction in fly ash ammonia content by dry ozone treatment (sample: 8 gm bed of basic fly ash, FA1). Flowrate: 2 lit/min; contact time: 30 minute. FIG. 9 shows the effect of ozonation on ammonia under dry conditions as a function of ozone concentration and temperature. Ozone reduces ash ammonia content under all conditions, but the truly significant reductions are observed at higher concentration (2 vol-%) and temperature (150° C.). The primary measurement in these experiments is residual ammonia on ash, and thus the data do not directly distinguish between removal and destruction, although direct oxidative attack leading to destruction of on ammonia species is the most likely mechanism. The experiment in oxygen alone proves that gas stripping is not responsible for the loss of ammonia.

The cumulative amount of ozone fed to the reactor in these FIG. 9 experiments ranged from 64 to 320 gm-ozone/kg ash and is a factor of 15–100 higher than the minimum theoretical stoichiometric requirement for complete $NH_3$ oxidation to nitrate and water. This high ozone usage is likely due to kinetic limitations of the ozone/ammonia reaction and to competition from the fast ozone/carbon chemisorption reaction [Gao et al., 2001]. The ozone/carbon chemisorption reaction is known to improve the air entrainment behavior of these high carbon ashes by reducing hydrophobic surface area [Gao et al., 2001], but here the reaction rapidly consumes ozone that would otherwise be available for ammonia destruction. The extent of ammonia removal/destruction by ozone increases with increasing temperature to 150° C., further suggesting kinetic limitations for this reaction.

Figure 10:
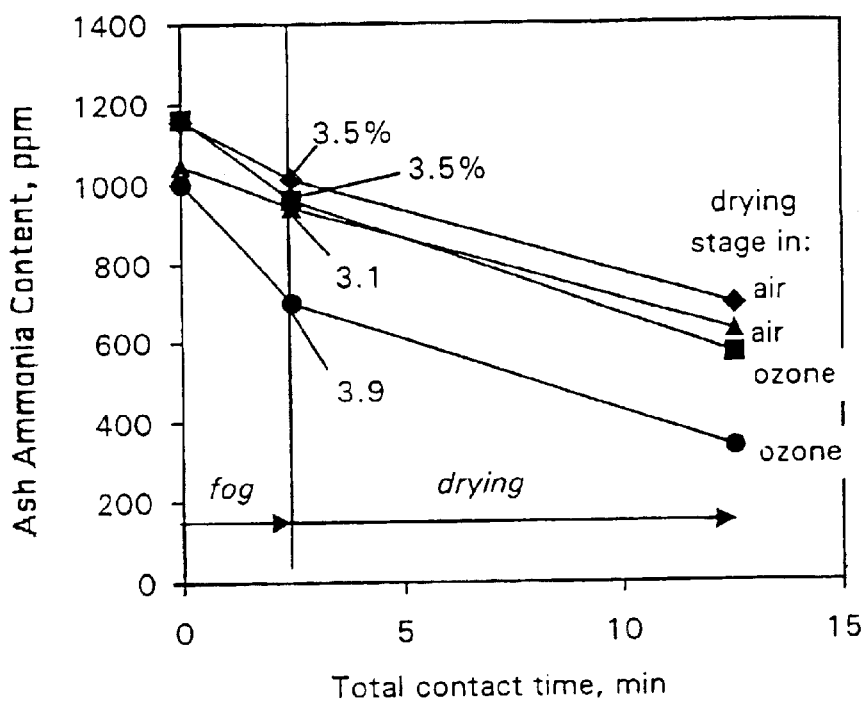

Several experiments were conducted to explore whether ozone has a beneficial effect during the drying stage of wet ammonia removal processes, which could eliminate the need for off-gas treatment. FIG. 10 shows experiments in which 3 vol-% ozone was substituted for the drying air in the flowing fog experiment. This plot shows that the ammonia removal is sensitive to the moisture content directly after fog addition (as observed previously), and that ozone has no substantial enhancing effect on ammonia release. It is likely that the release of ammonia from the liquid phase is too fast under these conditions to allow the aqueous reaction with ozone to be effective.

Figure 11:
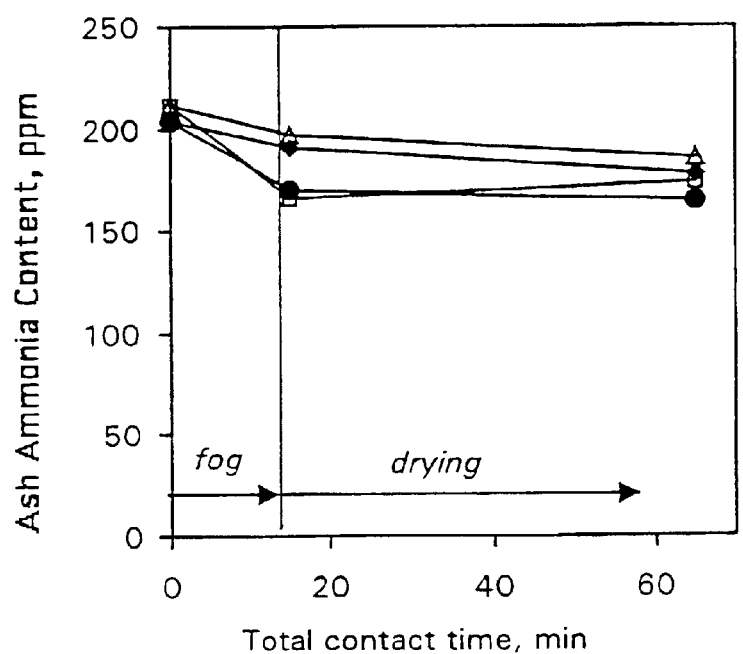

In acidic ashes by contrast the ammonia species remain in solution where they may be available for aqueous oxidative attack. FIG. 11 shows the effect of $H_2O_2$ and ozone as joint (peroxone) oxidizing agents during the semi-dry treatment of the acidic ash FA2 with flowing fog. FIG. 11 teaches the effect of $H_2O_2/O_3$ fog on ammonia removal/destruction from acidic ash (FA2). Fog contained 30 wt-% $H_2O_2$ and was transported using 0.7 lit/min of 3% ozone in oxygen. The drying stage used 0.3 lit/min of 5% ozone in dry oxygen. Moisture levels in the ash were similar in the 4 experiments, ranging from 12.7% to 13.7% directly after fog addition, and ranging from 6.1% to 7.2% after drying. Only modest reductions in ammonia are observed over a 60 minute treatment interval. Ammonia ozonation is heavily favored by thermodynamics, so this result implies slow kinetics, again with likely competition from the ozone carbon reaction. Peroxone oxidation is known to attack dissolved ammonia preferentially to ammonium ion, and the kinetics are thus sharply pH dependent [Kuo et al., 1991]. Under these conditions the peroxone kinetics are too slow to achieve substantial ammonia reductions, likely due to low concentrations of dissolved ammonia at the prevailing low pH. Perversely, at high pH ammonia is rapidly evolved, so rapid peroxone destruction of ammonia would require careful control of intermediate pH, if indeed it is possible at all.

FIG. 10 shows the effect of ozone addition during the drying stage of ammonia removal (sample: basic fly ash, FA1). The ozone containing stream was 3 vol-% ozone in air.

The disclosed invention demonstrates that ammonia species can be removed from fly ash at or near room temperature by a variety of dry and semi-dry techniques. Rapid ammonia removal occurs from a microscopic water film on surfaces, in fine pores, and in ash particle interstitial regions whenever the film pH is high—achieved either by dissolution of the natural basic components of the ash or by the separate introduction of soluble basic additives. Flowing humid air and flowing water aerosol (fog) as used in this invention are promising methods for the uniform addition of small amounts of water to fly ash for semi-dry ammonia removal. Ozone is capable of destroying ammonia on ash in the dry state, but is less effective under semi-dry conditions due to kinetic limitations on the aqueous phase reaction.

The use of ozone has an advantage in that no chemical residue is left in the ash since ozone decomposes shortly after use into molecular oxygen.

In the past a variety of processes have been proposed for removing or destroying ammonia in fly ash, but they involve either large amounts of water, intense mechanical agitation, high temperature, or aggressive chemical agents that remain in the ash. The herein disclosed invention suggests methods for dry or semi-dry reduction in ash ammonia contents at or near room temperature without the need for intense mechanical agitation or long-lived chemical additives.

The herein disclosed invention describes a method for removing ammonia from fly ash. Ammonia on fly ash is a by-product of the combustion of coal. When fly ash is used as a concrete additive, it is desirable to have the ammonia removed from the fly ash. Applying water to the ammonia-bearing fly ash causes the ammonia to detach and to be dissipated into the atmosphere. The addition of high pH liquid will cause the release of ammonia. The amount of ammonia on the fly ash can be up to 2,000 ppm. The amount of water aerosol relative to total ammonia containing fly ash can be 1 to 5%. The overall temperature of the process is not critical. Ambient temperature would be operative. A temperature which is too high would not allow for the effective removal of ammonia. The process can be carried out in a fly ash stream. Note, also, that a high pH can be used to convert the ammonia salt to ammonia.

The invention seeks to optimize the amount of water relative to the overall amount of fly ash. It is desirable not to use any excess amount of water. The small amount of water can be applied as an aerosol or a fog. A film is formed around the particles of the fly ash. The process can be carried out with all components in suspension. The particles are fine. The process can be carried out in a fluid bed or in a pneumatic system. During the moisture treatment, the particles of fly ash release ammonia. Note that ammonia gas is poorly soluble in water.

The invention also involves simultaneously adding ozone and water fog (mist) to the fly ash to achieve enhanced ammonia removal/destruction.

Examples of the Process

1. A process for removing ammonia from fly ash based on addition of fine water mist to a co-flowing fly ash stream in controlled amounts to produce fly ash with uniform 1–5 wt-% moisture. The water droplets must be fine enough to remain suspended as an aerosol for uniform wetting of the dispersed ash. After mist/ash mixing, the co-flowing suspension is subjected to gas/particle separation to yield a reduced-ammonia ash suitable for disposal or utilization and an ammonia-laden waste gas stream.

2. A process for removing ammonia from fly ash based on addition of warm humid air to a co-flowing fly ash stream of lower temperature. The temperature and flow rate of the humid air are controlled so that when the suspension is mixed and cooled to ambient temperature, water vapor condenses in an amount that constitutes 1–5 wt-% moisture in the solid ash for optimal semi-dry ammonia removal. After mixing of the fly ash and warm humid air, the co-flowing suspension is subjected to gas/particle separation to yield a reduced-ammonia ash suitable for disposal or utilization and an ammonia-laden waste gas stream.

3. A process for reducing the ammonia content of fly ash by contacting an ozone-containing gas with fly ash in the dry or semi-dry state. A variety of contacting methods can be used, including co-flowing suspension, fluidized beds, and mechanically agitated beds.

4. A process that combines two or more of the above features to accomplish dry or semi-dry (<5 wt-% moisture) ammonia reduction at temperatures below 150° C.

EXAMPLE

Figure 12:
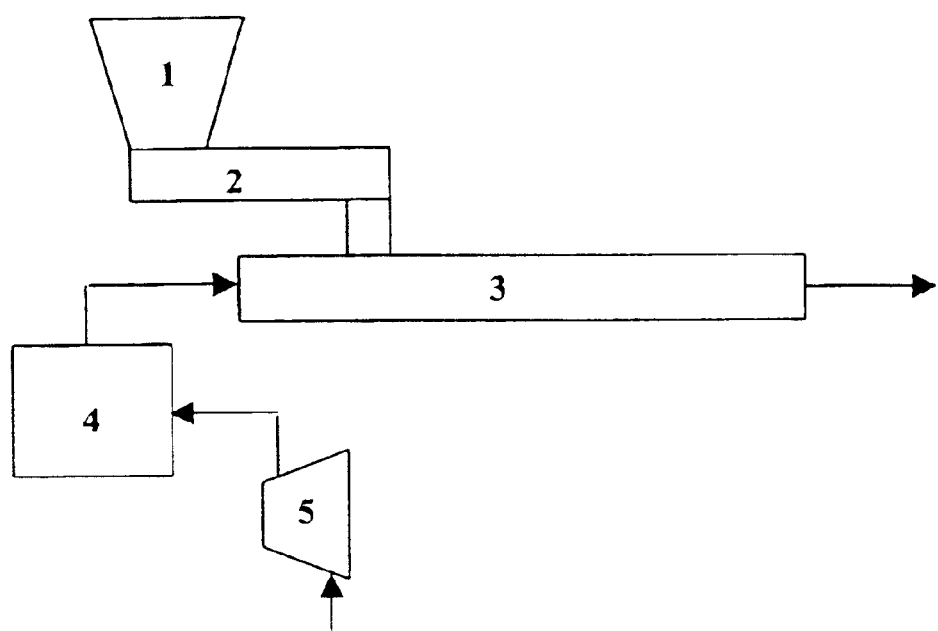

A sketch of the ammonial removal process is shown in FIG. 12. The items are: (1) ash hopper, (2) screw feeder for controlled metering of ash, (3) transport pipe for ash/gas contacting, (4) industrial humidifier and/or water mist generator and/or ozone generator, (5) air compressor. The ash is continuously metered into a transport pipe, 3, where is it mixed with air that has been previously treated with a combination of humidification, water mist injection, or ozone generation by established commercial techniques. The ash and treated gas mix and co-flow in the transport pipe to a gas/solid separation device which may be integrated into a collection vessel/ash storage silo.

As an example of conditions for humid air, one kilogram of 20° C. fly ash can be treated by one kilogram of 40° C. (warm) air at 90% relative humidity. The 40° C. contains 4.2 wt-% water vapor, much of which is relinquished when the mixture cools below 30° C. At 20° C. the total condensed water constitutes 2.8 wt-% of the ash. A range of moisture levels above and below this value can be selected by modest variation of the inlet temperature to the humidifier. The amount of water added by flowing mist is controlled by regulating the water input to the mist generator, and the ozone amounts by the control systems integrated into commercial ozone generators.

Obviously, many modifications may be made without departing from the basic spirit of the present invention. Accordingly, it will be appreciated by those skilled in the art that within the scope of the appended claims, the invention may be practiced other than has been specifically described herein.

Tables

TABLE 1

Fly Ash Sample Properties

| Designation† | Class | LOI†† | ammonia content, ppm, w as-received | pH |
|---|---|---|---|---|
| FA1 (A22) | F | 33.6% | 1060 | 11.8 |
| FA2 (A74) | F | 10.0% | 214 | 7.9 |
| FA3 (A21) | F | 6.1% | ~0 | 7.1 |
| FA4 (A73) | C | 0.5% | ~0 | 11.4 |

†in parentheses are given the original identification code used in the Brown. University sample bank, allowing cross-reference with other documents.
††"Loss on ignition," an approximate measure of unburned carbon content (see text).

TABLE 2

Inorganic Elemental Composition of Commercial Ammoniated Ash Samples

| Element | FA1, bulk wt % | FA1, XPS† wt % | FA2, bulk wt % |
|---|---|---|---|
| Aluminum as $Al_2O_3$ | 19.6 | 20.3 | 28.8 |
| Calcium as CaO | 2.4 | 3.9 | 1.3 |
| Iron as $Fe_2O_3$ | 7.2 | 2.6 | 4.7 |
| Magnesium as MgO | 3.2 | 2.3 | 0.97 |
| Manganese, as MnO | 0.06 | — | 0.02 |
| Phosphorus as $P_2O_5$ | 0.05 | — | 0.02 |
| Silicon as $SiO_2$ | 60.0 | 54.0 | 58.4 |
| Sodium as $Na_2O$ | 0.56 | 1.2 | 0.91 |
| Sulfur as $SO_3$ | 2.3 | 14.9 | 0.44 |
| Titanium as $TiO_2$ | 0.92 | 0.77 | 1.8 |

†near-surface composition

TABLE 3

Results of Ammonia Removal with High-pH Fog† from Acidic Ash, FA2 (initial ammonia content 240 ppm)

| Processing conditions | Ash properties after fog stage | | Ash properties after drying stage | |
|---|---|---|---|---|
| | moisture (wt %) | ammonia (ppm, w) | moisture (wt %) | ammonia (ppm, w) |
| 3 min fog/10 min dry | 1.0 | 240 | 0.1 | 229 |
| 6 min fog/10 min dry | 2.6 | 94 | 1.5 | 62 |
| 10 min fog/10 min dry | 5.2 | 62 | 3.9 | 56 |

†4 M NaOH solution

REFERNCES

Bittner, J., Gasiorowski, S., Hrach, F., "Removing Ammonia from Fly Ash," presented at the 14th International Symposium on Management and Use of Coal Combustion Products, San Antonio, January, 2001, published by the Electric Power Research Institute, Palo Alto, Calif.

Brendel G., Rathbone, R., Frey, R., "Effects of Ammonia Adsorption on Fly Ash Due to Installation of Nox Reduction Technologies," presented at the 14th International Symposium on Management and Use of Coal Combustion Products, San Antonio, January, 2001, published by the Electric Power Research Institute, Palo Alto, Calif.

Castle, G. S. P., "Mechanisms involved in fly ash precipitation in the presence of conditioning agents—a review," *IEEE Trans. Ind App.* 1A-16 297–302 (1980).

Gao, Y., Küilaots, I., Chen, X., Aggarwal, R., Mehta, A., Suuberg, E. M., Hurt, R. H., "Ozonation for the Chemical Modification of Carbon Surfaces in Fly Ash," *Fuel* 80 765–768 (2001).

Gasiorowski; S. A., Hrach, F. J. Jr.; Frank J., U.S. patent US1999000256128, issued Jun. 20, 2000.

Gedeon A, Lassoued A, Bonardet J L, Fraissard J., "Surface acidity diagnosis and catalytic activity of AISBA materials obtained by direct synthesis," *Microporous and Mesoporous. Materials,* 44: 801–806 (2001)

Giampa V. M., "Ammonia removal from coal fly ash by carbon burn-out," presented at the 14th International Symposium on Management and Use of Coal Combustion Products, San Antonio, January, 2001, published by the Electric Power Research Institute, Palo Alto, Calif.

Golden, D. "Beneficiation of Ammonia "Enhanced" Fly Ash for Use in Concrete" presented at the 14th International Symposium on Management and Use of Coal Combustion Products, San Antonio, January, 2001, published by the Electric Power Research Institute, Palo Alto, Calif.

Gonosuke, F., Sc. B. Thesis, Division of Engineering, Brown University, 2000.

Hinton S., "Investigation of Ammonia Adsorption on Fly Ash and Potential Impacts of Ammoniated Ash," EPRI, Palo Alto, Calif. 1999: TR-113777.

Hwang, J.-Y., 'Method for Removal of Ammonia from Fly Ash," International Patent WO9948563A1, issued Sept. 30, 1999.

Janssen, F., Van der Kerkof, F., Lefers, J., Lodder, P., Luierweert, L., "The determination of ammonia in flue gas from the selective catalytic reduction of nicric oxide with ammonia," *Anal. Chim. Acta* 190 245–254 (1986).

Katsuya, M., Taisuke, S., Yukio K., Tamotsu, N., Japanese Patent JP8187484A "Deammonification Treatment of Coal Ash and Apparatus Therefore," issued Jul. 23, 1996.

Kulaots, I. Ph.D. Dissertation, Division of Engineering, Brown University, 2001.

Kuo C., Yuan, F., Hill D., 'Kinetics of Oxidation of Ammonia in solutions Containing Ozone with or without Hydrogen Peroxide," Ind. Eng. Chem. Res. 36 (10) 4106–4113 (1997).

Larrimore, L. presented at the EPRI Conference on the Effects of Coal Quality on Power Plant Management, The Electric Power Research Institute, May 2000.

Levy, E., Huang, d., Herrea, C., "Ammonia Removal from Fly Ash in a Bubbling Fluidized Bed," presented at the 14th International Symposium on Management and Use of Coal Combustion Products, San Antonio, January, 2001, published by the Electric Power Research Institute, Palo Alto, Calif.

Lowe, P. A., Ellison, W. A., Makansi, J., "Strict European NOx code brings SCR into the limelight," *Power* 130 53–56 (1989).

Muzio, L. J., Kim, E. N., McVickar, M., Quartucy, G. C., McElroy, M., Winegar, P., "Ammonia Absorption on coal and Oil Fly Ashes," Joint EPRI/EPA Symposium on Stationary Combustion NOx Control, Kansas City, May 16–19 (1995).

Necker, P., "Experience Gained by Neckarwerke from Operation of SCR DeNOx Units," 1989 *Symposium on Stationary Combustion Nitrogen Oxide Control*, Electric Power Research Institute, Volume 2 pp. 6A-19 to 6A-38, May (1989).

Novak, M., Rych, H. G., "Design and Operation of the SCR-Type Box-Reduction Plants at the Durnrohr Power Station in Austria," 1989 *Symposium on Stationary Combustion Nitrogen Oxide Control*, Electric Power Research Institute, Volume 2 pp. 7A-1 to 7A-26, May (1989).

Ramme, B., Fisher, B., "Ash Beneficiation Through Wisconsin Electric Power Company's Ammonia Liberation Process," presented at the 14th International Symposium on Management and Use of Coal Combustion Products, San Antonio, January, 2001, published by the Electric Power Research Institute, Palo Alto, Calif.

Rubel, A., Rathbone, R., Stencel J., "Determining the Form and Concentration of Ammonia in Coal Combustion Ashes by TG-MS," presented at the 14th International Symposium on Management and Use of Coal Combustion Products, San Antonio, January, 2001, published by the Electric Power Research Institute, Palo Alto, Calif.

Sahu N., Arora, M. K., Upadhyay, S. N., Sinha, A. S. K., "Phase Transformation and Activity of Cadmium Sulfied Photocatalysts for Hydrogen Production from Water: Role of Adsorbed Ammonia on Cadmium Sulfate Precursor," *Ind. Eng. Chem. Res.* 37 4682–4688 (1998).

Turner, J. R., Chone, S., Dudukovic, M. P., *Chemical Engineering Science*, 49 24A 4315–4325 (1994).

Wexler, A. S., Seinfeld, J. H., *Atmospheric Environment* 25A 2731, 1991.

What is claimed is:

1. A method for removing ammonia from fly ash comprising subjecting ammonia containing fly ash to a water mist or fog wherein the water mist or fog contacts the ammonia containing fly-ash and removes the ammonia from the fly ash and then subjecting the fly ash to gas/particle separation to produce a fly ash of reduced ammonia content.

2. The method of claim 1 wherein the water mist is applied to the fly ash in a warm air environment.

3. The method of claim 1 wherein the method is carried out at a pH of greater than 10.

4. The method of claim 1 wherein the amount of water relative to fly ash is 1 to 5 wt-%.

5. The method of claim 1 wherein the fly ash has a basic pH.

6. The method of claim 1 wherein the water mist has a basic pH.

7. The method of claim 1 for removing ammonia from fly ash comprising subjecting said ammonia containing fly ash to said water mist in a co-flowing fly ash stream in controlled amounts to produce fly ash with uniform 1–5 wt-% moisture, with the water mist being composed of water droplets being fine enough to remain suspended as an aerosol for uniform wetting of the dispersed ash after mist/ash mixing, and then the produced co-flowing suspension being subjected to gas/particle separation to yield a reduced-ammonia ash suitable for disposal or utilization along with an ammonia-laden waste gas stream.

8. The method of claim 1 wherein the fog or mist is produced with an ultrasonic nebulizer in a flowing humid air stream flowing through an agitated fly ash bed.

9. The method of claim 1 wherein drying takes place after treatment with the water fog.

10. The method of claim 1 wherein the ash is an acid ash which has been treated to make it basic.

11. The method of claim 10 wherein the fly ash is mixed with $Ca(OH)_2$ to make it basic.

12. The method of claim 1 wherein ozone containing air or ozone containing oxygen is used as a dryer gas or a fog carrier gas.

13. The method of claim 12 wherein co-oxidant aqueous $H_2O_2$ is used as the liquid feed for fog generation.

14. A method for removing ammonia from fly ash comprising subjecting ammonia containing fly ash to warm humid air wherein the warm humid air contacts the ammonia containing fly-ash and dissolves and removes the ammonia from the fly ash and then subjecting the fly ash to gas/particle separation to produce a fly ash of reduced ammonia content.

15. The method of claim 14 wherein the method is carried out by passing a stream of humidified air through a fixed bed of fly ash in an up-flow configuration.

16. The method of claim 14 for removing ammonia from fly ash comprising subjecting said ammonia containing fly ash to said warm humid air in a co-flowing fly ash stream of lower temperature, the temperature and flow rate of the warm humid air being controlled so that when the suspension is mixed and cooled to ambient temperature, water vapor condenses in an amount that constitutes 1–5 wt-% moisture in the solid ash for optimal semi-dry ammonia removal and after the mixing the fly ash and warm humid air are subjected to gas/particle separation to yield a reduced-ammonia fly ash suitable for disposal or utilization as well as an ammonia-laden waste gas stream.

17. A method for reducing ammonia on fly ash comprising applying effective amounts ozone to the surface of ammoniated fly ash to reduce ammonia thereon.

18. The method of claim 17 wherein the ozone is applied at a concentration of about two vol-% and a temperature of about 150° C.

19. The method of claim 17 wherein the amount of ozone added ranges from about 64 to 320 gm-ozone/kg ash.

20. The method of claim 17 where the amount of ozone added ranges from about 0 to 500 gm-ozone/kg ash.

21. The method of claim 17 wherein the fly ash is in the dry or semi-dry state.

22. The method of claim 17 wherein the applying is done in a co-flowing suspension, fluidized bed, or a mechanically agitated bed.

23. A method for removing ammonia from fly ash comprising applying to the surface of ammoniated fly ash both 1–5% moisture and ozone treatment to accomplish dry or semi-dry (<5 wt-% moisture) ammonia reduction at temperatures below 150° C.

24. A method for ridding fly ash of ammonia comprising applying a mixture of hydrogen peroxide ($H_2O_2$) and ozone as co-oxidizing agents in amounts effective to reduce ammonia in fly ash as a flowing fog or mist during semi-dry ash treatment.

* * * * *